Figure 1:
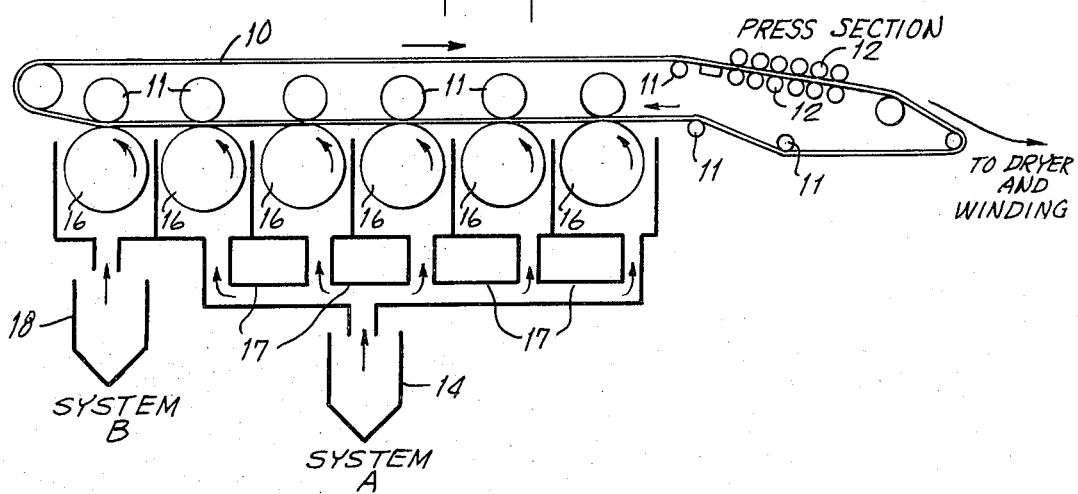

United States Patent [19]

Breiner

[11] 3,770,569
[45] Nov. 6, 1973

[54] ASBESTOS-PLASTIC FILM LAMINATES
[75] Inventor: Richard C. Breiner, Hatboro, Pa.
[73] Assignee: Nicolet Industries, Inc., Ambler, Pa.
[22] Filed: Feb. 22, 1971
[21] Appl. No.: 117,543

[52] U.S. Cl.............. 161/205, 161/193, 161/165, 161/403, 161/406, 156/306, 156/308
[51] Int. Cl....................... B32b 13/04, B32b 19/08
[58] Field of Search................... 161/165, 205, 403, 161/406

[56] References Cited
UNITED STATES PATENTS

| | | | |
|---|---|---|---|
| 2,272,144 | 2/1942 | Allen | 161/406 |
| 3,188,263 | 6/1965 | Pflaumer | 161/205 |
| 3,619,354 | 11/1971 | Woolery | 161/205 |
| 2,938,822 | 5/1960 | Nelson | 161/205 |
| 292,037 | 1/1884 | Nagel | 161/403 |
| 1,523,634 | 1/1925 | Crabbs | 161/403 |
| 2,638,638 | 5/1953 | McBride | 161/406 |
| 3,332,830 | 7/1967 | Tomlinson et al. | 161/403 |
| 3,511,748 | 5/1970 | Heeb et al. | 161/205 |
| 3,554,861 | 1/1971 | Ermenc et al. | 161/205 |

Primary Examiner—George F. Lesmes
Assistant Examiner—S. Silverman
Attorney—Robert S. Dunham, P. E. Henninger, Lester W. Clark, Gerald W. Griffin, Thomas F. Moran, Howard J. Churchill, R. Bradlee Boal, Christopher C. Dunham, Robert Scobey and Henry T. Burke

[57] ABSTRACT

An asbestos-plastic film laminate useful as a strippable, non-flammable wallpaper and which is dimensionally stable and mildew resistant, is made up of a first sheet of asbestos having a thickness of about 0.010 inch, a second sheet of asbestos built up and formed directly on said first sheet of asbestos, said second sheet of asbestos having a thickness of about 0.002 inch and a plastic film, e.g. a polyvinyl chloride film, applied to and affixed to the other side of said first sheet of asbestos, said plastic film having a thickness in the range from about 0.001 to about 0.003 inch.

8 Claims, 3 Drawing Figures

INVENTOR
RICHARD C. BREINER
BY
Thomas F. Trocan
ATTORNEY

ASBESTOS-PLASTIC FILM LAMINATES

This invention relates to asbestos-plastic film laminates. In accordance with one embodiment this invention is directed to a strippable, substantially non-flammable, asbestos-plastic film laminate useful as wallpaper, as upholstery in automobiles, airplanes, etc. In accordance with another embodiment this invention is directed to the production of an asbestos-plastic film laminate which is substantially non-flammable, dimensionally stable and mildew resistant, properties particularly desirable in a strippable wallpaper.

Strippable wallpapers have been made from cellulosic, synthetic and vegetable fibers. Patterns are applied to the wallpaper and the wallpaper is affixed or adhered to the wall to be covered by means of a suitable paste or contact adhesive. When the applied strippable wallpaper is no longer wanted the wallpaper is removed by pulling or stripping the wallpaper from the wall without requiring the use of steam or moisture. When the strippable wallpaper is removed a thin fibrous ply is usually left upon the wall and upon this ply a new wallpaper can be applied.

Conventional strippable wallpapers are flammable, not dimensionally stable, susceptible to moisture, humidity variations and mildew. Further, strippable wallpapers available heretofore have not been uniformly strippable.

It is an object of this invention to provide an asbestos-plastic film laminate useful as an upholstery material or as a strippable wallpaper.

It is another object of this invention to provide a dimensionally stable, mildew resistant asbestos-plastic film laminate.

Still another object of this invention is to provide a method of forming a multi-ply asbestos sheet structure wherein one asbestos-containing sheet is readily strippable from another asbestos-containing sheet in contact therewith.

Still another object of this invention is to provide a method for the production of an asbestos-plastic film laminate useful as a strippable wallpaper.

Figure 2:
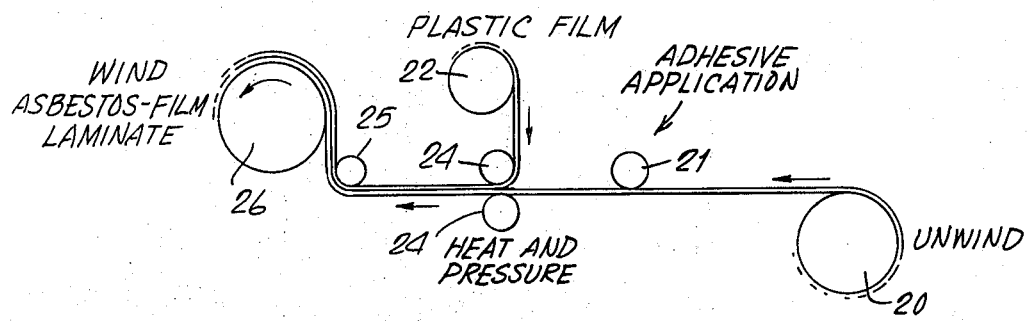
Figure 3:
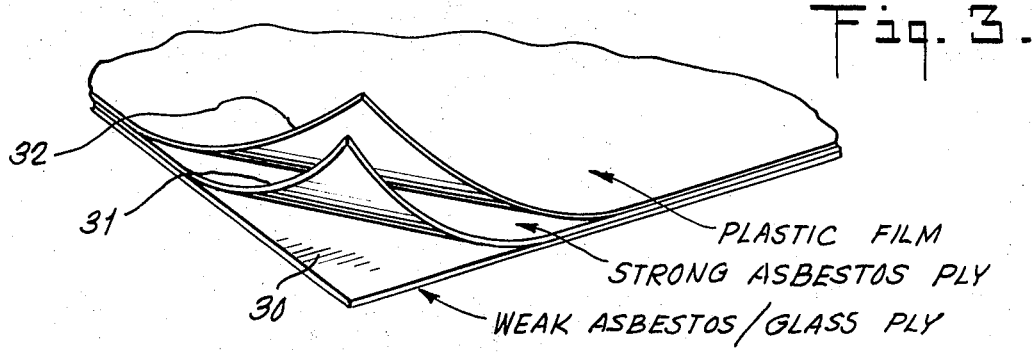

How these and other objects of this invention are achieved will become apparent in the light of the accompanying disclosure made with reference to the accompanying drawings wherein:

FIG. 1 schematically illustrates a process for the manufacture of a two ply asbestos sheet structure characterized in that one of the asbestos plies is readily strippable or removable from the other asbestos ply in contact therewith;

FIG. 2 schematically illustrates the formation of an asbestos-plastic film laminate in accordance with this invention wherein the multi-ply asbestos sheet structure produced by the process illustrated in FIG. 1 is coated with or has applied thereto a plastic film and wherein;

FIG. 3 schematically illustrates the asbestos-plastic film laminate structure produced by the process illustrated in FIG. 2.

An asbestos-plastic film laminate in accordance with this invention is made up of a first sheet of asbestos, such as a first sheet of asbestos paper, a plastic film applied to and affixed to one side of said first sheet of asbestos paper and a second sheet of glass fiber or asbestos, such as a second sheet of asbestos paper, applied to and affixed to the other side of said first asbestos sheet.

The first sheet of asbestos has a thickness substantially greater than the thickness of the second sheet of asbestos. For example, the first sheet of asbestos would have a thickness of about 0.010 inch, such as a thickness in the range from about 0.005 inch to about 0.020 inch whereas the second sheet of asbestos would have a relatively small thickness of about 0.002 inch, such as a thickness in the range 0.0005 inch to about 0.005 inch.

The plastic film applied to the first sheet of asbestos would have a thickness of about 0.002 inch, such as a thickness in the range from about 0.001 inch to about 0.010 inch. Advantageously, the second sheet of asbestos employed in the manufacture of the asbestos-plastic film laminate in accordance with this invention might comprise only glass fibers as a substitute for the asbestos fibers. It is desirable, however, for the second asbestos sheet to be made up of an admixture of asbestos fibers and glass fibers or admixtures of asbestos and mineral fibers (mineral wool) or asbestos and diatomaceous earth (Johns-Manville CELITE), or asbestos and finely ground vermiculite (Verxite FCF, Zonolite Div., W. R. Grace Co.). The second asbestos sheet of the asbestos-plastic film laminate in accordance with this invention provides or forms a weak strippable bond with the first sheet of asbestos.

In the preparation of the asbestos sheets, such as the sheets of asbestos paper employed in the manufacture of the asbestos-plastic film laminates, the asbestos sheet or paper requires some binder to provide strength and satisfactory handling properties to the resulting asbestos sheet. Asbestos paper formed without a binder or with a low binder content, such as a binder content in the range from about 0.5 to about 2 percent by weight, is usually too weak and provides insufficient substance or body for handling and would permit bleed-through of the adhesive if the resulting asbestos sheet or paper were employed in the manufacture of an asbestos-plastic film laminate used as a wallpaper. On the other hand, an asbestos sheet of paper having a high binder content, such as a binder content above about 20 percent by weight, would yield an asbestos sheet having increased flammability. In essence, therefore, in the production of an asbestos-plastic film laminate in accordance with this invention there is produced a combination of sheets, one sheet having a high binder content relative to the other sheet in contact therewith so as to provide an asbestos sheet with good handling properties and strength and which would prevent the bleed-through of any adhesive and the other asbestos sheet having a relatively low binder content to yield a relatively weak asbestos sheet which could be easily stripped from the first mentioned asbestos sheet. The combination of these sheets of asbestos together with another ply, a plastic film, provides the resulting asbestos-plastic film laminate structure of this invention having the aforementioned improved properties and special utility as a dimensionally stable, substantially non-flammable, mildew-resistant, strippable wallpaper.

The plastic film of the asbestos-plastic laminate structures of this invention provide toughness, washability and abrasion resistance to the resulting structure. The plastic film may be provided with a printed pattern or may be a clear, transparent plastic film in which instance the underlying asbestos sheet would be printed with a pattern. Plastic films which are useful in the manufacture of asbestos-plastic film laminates in accordance with this invention include the various polyolefin films, such as polyethylene, polypropylene, the various polyvinyls, including polyvinyl chloride and polyvinylidene chloride. Acrylic films may also be used but polyvinyl chloride and polyvinylidene are preferred for non-burning characteristics.

The plastic film may be adhered to the underlying asbestos sheet in the manufacture of an asbestos-plastic film laminate in accordance with this invention by the application of pressure or heat and pressure, such as by calendering a plastic film onto an asbestos sheet. The affixing of a plastic film to an underlying asbestos substrate is particularly convenient in the practice of this invention when the plastic film is relatively soft, i.e. has a substantial plasticizer content, so that the plastic film can be readily, upon the application of pressure, forced into the interstices of the underlying asbestos substrate. Alternatively, the plastic film may be affixed to the underlying asbestos sheet by means of an adhesive, such as a wheat paste, or a chemical adhesive, such as a urethane adhesive or a rubber cement or by means of a polyvinyl chloride or a polyacrylonitrile adhesive or neoprene-containing adhesive. Adhesive bonding of film to asbestos generally provides the strongest bond.

Referring now to the drawings which schematically illustrate processes employed in the practice of this invention and the resulting product, FIG. 1 shows an asbestos paper-making operation for the manufacture of the two plies of asbestos sheet or paper employed in the fabrication of an asbestos-plastic film laminate in accordance with this invention. The asbestos paper-making operation illustrated in FIG. 1 employs a conventional Fourdrinier machine comprising an endless belt 10 moving on rollers 11 in the direction indicated by the arrows. A press section made up of a plurality of press rollers 12 disposed transversely of and on both sides of belt 10 is employed to dry the asbestos web carried on top or outside of belt 10.

In operation, in the preparation of the asbestos sheets or plies in accordance with this invention a dual or two stock system is employed. One system, System A, is prepared in mixing vat 14 and supplied to tank 15. Tank 15 is provided with a plurality of asbestos paper-making rolls 16 in sections thereof defined by dividers 17. Paper-making rolls rotate as indicated by the arrows and a web of asbestos is formed thereon. As the web is formed and brought into contact with belt 10 the formed web is transferred from respective roll 16 to belt 10. In this manner as increasingly thick asbestos web or layer of asbestos paper is built up on belt 10 as it moves along in contact with rolls 16.

The stock or furnish produced in vat 14 is in accordance with standard asbestos paper-making techniques and formulation. The solids components of the furnish or system are made up of highly cleaned chrysotile asbestos fiber, e.g. 7 Grade PB5 asbestos sold by Johns Manville Corp. or Asbestos Corporation fiber 431EX7D in an amount in the range 80–90 percent by weight of the solids content of the furnish. A whitening agent is desirably incorporated in the furnish, such as finely divided titanium dioxide, e.g. anatase titanium dioxide, Ti-Pure, sold by E. I. duPont de Nemours Co., Inc. Additionally, there is incorporated in the furnish an amount of organic binder in the range 2–18 percent by weight, such as polyvinyl chloride binder, e.g. Geon 450-X23 sold by B. F. Goodrich Chemical Co. The web of asbestos paper formed on belt 10 from the system A furnish provides the strong asbestos ply or sheet, e.g. the asbestos sheet having the final thickness of about 0.010 inch of the finished asbestos-plastic film laminate in accordance with this invention. The asbestos sheet or ply derived from the System A furnish makes up about 80 to 90 percent by weight of the total asbestos sheet eventually formed on belt 10.

The terminal paper-making stage of the asbestos paper-making machine illustrated in FIG. 1 is supplied with a System B furnish from vat 18. The asbestos paper formed on paper-making roll 16 derived from System B furnish is applied to the asbestos web on belt 10 as the last asbestos web or ply thereon. The web formed from the System B furnish and last applied onto belt 10 comprises the weak, thin ply of glass and/or asbestos paper making up the product asbestos-plastic laminate and forms the strippable weak portion thereof. The web formed from the System B furnish contributes to about 10–20 percent by weight of the final web formed on belt 10. The System B furnish, based on the solids content, is made up of 0–90 percent highly cleaned chrysotile asbestos fiber, e.g. Canadian Grade 5, 6 or 7 chrysotile asbestos fiber, 0–90 percent glass fiber, e.g. SG glass fiber sold by Johns Manville or milled glass fiber sold by Owens Corning. The solids making up the System B furnish also contain 0–1 percent by weight whitening agent, such as titanium dioxide and 1–5 percent by weight of a suitable binder, such as polyvinyl chloride. Other whitening agents which may be employed in the manufacture of the furnishes of System A or System B include calcium carbonate and calcium silicate. Relatively non-flammable agents or binder which may be employed in the furnishes of Systems A or B include polyvinylidene chloride and chloroprene. If necessary, and as may be required, stablizing agents and antioxidants for the binders might also be incorporated in the furnish of Systems A and B.

The furnishes of Systems A and B having the above-described solids composition are prepared in accordance with standard asbestos paper-making practices. The solids content of the furnishes of Systems A and B comprise about 0.5–5.0 percent by weight of the furnish, the remainder being water. Usually the solids content of the furnish is in the range 1.5–3.5 percent by weight.

The web of asbestos formed on belt 10 passes through the press section thereof between press rolls 12 which serve to remove a substantial amount of water therefrom and the resulting asbestos web, now having a substantially reduced water content passes onto the drying and winding section as illustrated.

As mentioned hereinabove the finished web moving off belt 10 for drying and winding is made up of an asbestos web or ply derived from the System A furnish and a ply derived from the System B furnish. The web or ply derived from the System A furnish contributes to a major amount the final thickness of the finsihed web, e.g. about 0.010 inch. The web or ply derived from the System B furnish contributes only a minor amount to the thickness of the finished web, such as a thickness of about 0.002 inch.

Referring now to FIG. 2 of the drawings, after the asbestos web formed in the manner schematically illustrated in FIG. 1 has been dried and wound and calendered to provide a smooth surface, the web is unwound from roll 20 and passed through an adhesive application station generally indicated by reference numeral 21 wherein a suitable adhesive, such as urethane adhesive, e.g. Cyanprene Latex X5 sold by American Cyanamide, is applied to the top surface thereof. Thereupon a film of plastic, such as polyvinyl chloride plastic, from roll 22 is pressed onto the adhesive coated asbestos web as the plastic film and web moves between rolls 24 which serve to apply pressure to the thus-joined webs of plastic and asbestos. The resulting asbestos-plastic film laminate then moves past roller 25 onto take-up roll 26.

FIG. 3 schematically illustrates the make-up of the resulting asbestos-plastic laminate. As indicated, asbestos or glass fiber sheet 30 formed on the paper-making equipment from the System B furnish, is the weak strippable ply. The other asbestos ply 31 formed on the asbestos paper-making machine from the System A furnish comprises the relatively strong asbestos ply of the finished asbestos-plastic film laminate. The plastic film 32 which may be printed or patterned imparts abrasion and wear resistance and washability to the resulting structure, such as when the resulting asbestos-plastic film laminate structure is employed as a wall coating. When employed as a wall coating the asbestos-plastic film laminate is adhesively secured or applied on the asbestos side to the surface to be covered.

When it is desired to remove the coating from the covered surface the coating is simply mechanically stripped or removed therefrom. Upon mechanical removal or stripping, the plastic film and the relatively strong asbestos ply derived from the System A furnish are removed since the asbestos and/or glass fiber ply derived from the System B furnish and in immediate contact with the substrate or surface which has been covered breaks, thereby permitting the simultaneous removal of the plastic film and the System A furnish asbestos ply.

The following examples are illustrative of the practice of this invention.

EXAMPLE NO. 1

An asbestos web having a thickness of 0.010 inch was formed from a System A furnish made up of a solids content of 84 percent by weight chrysotile asbestos fibers, 15 percent by weight polyvinyl chloride and 1 percent by weight titanium dioxide. A second asbestos web was then formed on this first asbestos web; the second asbestos web having a thickness of 0.002 inch was formed on the above 0.010 inch thick asbestos web from a System B furnish having a solids composition of 75 percent by weight chrysotile asbestos fibers, 23 percent by weight glass fiber and 2 percent by weight polyvinyl chloride. The resulting formed webs as a single sheet were then dried by conventional asbestos paper-making techniques and a film of polyvinyl chloride having a thickness of 0.002 inch was applied by means of urethane adhesive onto the System B furnish side, i.e. to the exposed side of the asbestos ply having a thickness of 0.010 inch.

EXAMPLE NO. 2

An asbestos-plastic film laminate was prepared in the manner described in connection with Example No. 1 save that the asbestos ply having a thickness of 0.002 inch was derived from a System B furnish having a solids content of 98 percent by weight asbestos fiber and 2 percent by weight polyvinyl chloride.

EXAMPLE NO. 3

An asbestos-plastic film laminate was prepared in accordance with the method of Example No. 1 save the 0.010 inch and 0.002 inch asbestos ply portions were each derived from a furnish having the solids composition of 96 percent by weight asbestos fiber and 4 percent by weight polyvinyl chloride.

EXAMPLE NO. 4

An asbestos-plastic film laminate was prepared in accordance with the method of Example No. 1 save the 0.010 inch and 0.002 inch asbestos ply portions were each derived from a furnish having the solids composition of 84 percent by weight asbestos fiber, 15 percent by weight polyvinyl chloride and 1 percent by weight titanium dioxide.

As will be apparent to those skilled in the art in the light of the foregoing disclosure, many modifications, alterations and substitutions are possible in the practice of this invention without departing from the spirit or scope thereof.

I claim:

1. An asbestos-plastic film laminate useful as a strippable, dimensionally stable, mildew resistant, non-flammable wallpaper consisting essentially of a first sheet consisting essentially of asbestos fibers and an organic binder therefor, a plastic film having a thickness in the range 0.001–0.010 inch applied to and affixed to one side on said first sheet of asbestos fibers and a second sheet consisting essentially of glass fibers and/or asbestos fibers and an organic binder therefor applied to and affixed to the other side of said first sheet, said first sheet having a thickness in the range 0.005–0.02 inch, said second sheet having a thickness in the range from about 0.0005 inch to about 0.005 inch and the organic binder content in said second sheet being present in an amount up to about 5 percent by weight and the organic binder in said first sheet being present in an amount up to about 20 percent by weight, the amount of organic binder in said first sheet being greater than the amount of organic binder in said second sheet.

2. An asbestos-plastic film laminate in accordance with claim 1 wherein said plastic film is polyvinyl chloride.

3. An asbestos-plastic film laminate in accordance with claim 1 wherein said plastic film is polyethylene.

4. An asbestos-plastic film laminate in accordance with claim 1 wherein said plastic film is polyvinylidene chloride.

5. An asbestos-plastic film laminate in acordance with claim 1 wherein said first sheet of asbestos comprises 80–90 percent by weight asbestos fiber, 1–3 percent by weight whitening agent and 2–18 percent by weight of an organic binder.

6. An asbestos-plastic film laminate in accordance with claim 5 wherein said whitening agent is titanium dioxide and wherein said binder is polyvinyl chloride.

7. An asbestos-plastic film laminate in accordance with claim 1 wherein said first sheet of asbestos comprises about 84 percent by weight asbestos fiber, about 15 percent by weight polyvinyl chloride as binder and about 1 percent by weight titanium dioxide as whitening agent, wherein said second sheet comprises 23 percent by weight glass fiber, about 75 percent by weight asbestos fiber and about 2 percent by weight polyvinyl chloride as binder.

8. An asbestos-plastic film laminate in accordance with claim 7 wherein said plastic film is affixed to said first sheet of asbestos by means of an adhesive.

* * * * *